US007061877B1

(12) United States Patent
Gummalla et al.

(10) Patent No.: US 7,061,877 B1
(45) Date of Patent: Jun. 13, 2006

(54) SYSTEM AND METHOD FOR PROVIDING HIGH SPEED WIRELESS MEDIA ACCESS

(75) Inventors: Ajay Chandra V. Gummalla, Atlanta, GA (US); John O. Limb, Atlanta, GA (US)

(73) Assignee: Georgia Tech Reseach Corporation, Atlanta, GA (US)

( * ) Notice: Subject to any disclaimer, the term of this patent is extended or adjusted under 35 U.S.C. 154(b) by 617 days.

(21) Appl. No.: 09/657,414

(22) Filed: Sep. 8, 2000

Related U.S. Application Data

(60) Provisional application No. 60/153,292, filed on Sep. 10, 1999, provisional application No. 60/153,351, filed on Sep. 10, 1999.

(51) Int. Cl.
  *H04B 7/005* (2006.01)
  *H04L 12/413* (2006.01)
  *H04L 12/433* (2006.01)

(52) U.S. Cl. .................. 370/278; 370/445; 370/459
(58) Field of Classification Search ............... 370/445, 370/447, 454, 459, 437, 438, 338, 278, 282, 370/450
See application file for complete search history.

(56) References Cited

U.S. PATENT DOCUMENTS

| 4,755,990 A | * | 7/1988 | Bohler et al. ............... 370/438 |
| 5,022,046 A | * | 6/1991 | Morrow, Jr. ................. 375/130 |
| 5,319,641 A | * | 6/1994 | Fridrich et al. ............. 370/447 |
| 5,394,391 A | * | 2/1995 | Chen et al. .................. 370/441 |
| 5,418,785 A | * | 5/1995 | Olshansky et al. .......... 370/438 |
| 5,438,683 A | * | 8/1995 | Durtler et al. ................ 455/74 |
| 5,502,724 A | * | 3/1996 | Chen et al. .................. 370/445 |
| 5,608,729 A | * | 3/1997 | Orsic .......................... 370/445 |
| 5,648,961 A | * | 7/1997 | Ebihara ....................... 370/282 |
| 5,661,727 A | * | 8/1997 | Kermani et al. ............. 370/445 |
| 6,088,343 A | * | 7/2000 | King ........................... 370/329 |
| 6,295,285 B1 | * | 9/2001 | Whitehead .................. 370/329 |
| 6,611,495 B1 | * | 8/2003 | Meyer et al. ............. 370/230.1 |
| 6,850,617 B1 | * | 2/2005 | Weigand ..................... 379/391 |
| 2002/0001291 A1 | * | 1/2002 | Willars et al. .............. 370/329 |

* cited by examiner

OTHER PUBLICATIONS

F. Tobagi and L. Kleinrock, "Packet Switching in Radio Channels: Part II—The Hidden Terminal Problem in Carrier Sense Multiple-Access and the Busy-Tone Solution," IEEE Transactions on Communications, vol. 12, pp 1417-1433, Dec. 1975.*

*Primary Examiner*—Hassan Kizou
*Assistant Examiner*—Gregory B. Sefcheck
(74) *Attorney, Agent, or Firm*—Thomas, Kayden, Horstemeyer & Risley, LLP

(57) ABSTRACT

A system and method for providing high speed wireless media access is disclosed. A local transceiver is provided, which is capable of transmitting data via a transmit path while receiving a feedback signal via a receive path. The local transmitter is connected to a feedback generator for generating and transmitting a feedback signal in response to receiving data from a wireless transceiver. A feedback detector is also connected to the local transceiver for detecting feedback signals received from other wireless transceivers. When a feedback signal is detected, data associated with the signal is decoded. The wireless transceivers then transmit a feedback signal within the series of wireless transceivers in order to stop the transmission of data until a destination of the data is determined. A destination address associated with a destination wireless transceiver is then identified and the transmission of feedback signals by all wireless transceivers within the system then ceases, except from the identified destination wireless transceiver.

21 Claims, 8 Drawing Sheets

SYSTEM AND METHOD FOR PROVIDING HIGH SPEED WIRELESS MEDIA ACCESS

CROSS REFERENCE TO RELATED APPLICATIONS

This application claims priority to and the benefit of the filing dates of U.S. Provisional Application Ser. No. 60/153,292, filed on Sep. 10, 1999, and entitled "High Speed Wireless Media Access," and U.S. Provisional Application Ser. No. 60/153,351, filed on Sep. 10, 1999, and entitled "Wireless Transceiver for High Speed Media Access," both of which are incorporated by reference herein in their entirety.

FIELD OF THE INVENTION

The present invention generally relates to wireless telecommunication, and more particularly, is related to a system and method for providing efficient high speed wireless media access via overlay of feedback and data channels within the same spectrum.

BACKGROUND OF THE INVENTION

The convergence of communications and computing technologies is leading to the next generation of networks where many millions of homes and small offices are connected full-time to the Internet, thereby leading to a truly global information age. These developments have sparked an interest in home networking. Several technologies are presently being considered for home networks, one of which is wireless technology. Wireless systems enable non-restrictive communication and eliminate the need to rewire homes for the new networks. Bringing any new technology into the home adds new challenges such as cost, reliability and ease of management, in addition to the optimal use of resources. Home networks need to support a wide variety of devices ranging from a television set to a light bulb.

Random access protocols are well suited for such networks because they can multiplex a wide range of data rates efficiently. Random access protocols are best suited for an ad-hoc wireless network because they require no central control. An ad-hoc wireless network is a collection of wireless nodes that can communicate with each other without the aid of any pre-existing communication infrastructure.

A medium access control (MAC) protocol enables multiple users, via multiple devices, to transmit and receive data on a shared wireless medium in an efficient and orderly manner. Wireless MAC protocols have been extensively researched and a large group of protocols proposed. With the exception of high performance local area network (HIPERLAN), as addressed below, all high speed MAC protocols require a central node such as a base station to coordinate transmissions. Such a central node is not possible in an ad-hoc network. As a result, random access is the multiple access mechanism in the ad-hoc networks. Most wireless random access protocols are designed for low data rates (<2 Mbps) and are based on collision avoidance principles.

Advancements in radio frequency and wireless communication technology are driving the data rates of wireless local area networks (WLAN) higher. In fact, the total bandwidth required by applications like digital video and audio is in excess of 50 Mbps. Unfortunately, recent standards developed for ad-hoc wireless LANs, including HIPERLAN, perform poorly at high data rates and for small packet sizes. The efficiency of random access protocol is determined by how fast collisions within a communication channel are detected and how soon this information can be conveyed to a source node. In wired protocols the ability of a node to listen to a medium while transmitting, and the fact that a collision on the medium is heard by all nodes listening to the medium, results in high performance.

In a wireless medium both the above assumptions do not exist. First, a wireless transceiver cannot be transmitting and listening to the medium at the same time due to self-interference. Basically, any transmitted signal that leaks into the receiver usually has a much higher energy than the received signal, and hence, transceivers cannot listen and transmit at the same time. In the wireless medium the signal strength falls off as a function of distance. Hence, depending on the position of a node relative to the source node, channel sensing will produce different results. Consider, for example, the scenario illustrated in FIG. 1 where node 106 is in radio coverage of nodes 104 and 108 and node 108 is in range of nodes 106 and 112. If node 106 is transmitting, nodes 104 and 108 sense the communication channel is busy while node 112 thinks the channel is idle. A transmission from node 112 will corrupt data reception at node 108. Unlike in a wired media, two simultaneous transmissions do not imply a collision. A collision occurs when the destination node cannot decode a transmission. Therefore, the destination node is the only node that can identify a collision. When a collision is detected, this information should be conveyed to the sending node, so that it can abort its transmission and minimize wasted channel capacity. The main reason for the low efficiency of these protocols is the lack of an efficient mechanism for the destination node to tell the sending node about the current transmission.

Those skilled in the art are perplexed by the problem of determining how to enable the destination node to convey information about its state of transmission, either idle or collision, to the source node in a timely manner. Unfortunately, a feedback channel is not available in current wireless systems since transmitted and received signal strengths differ by orders of magnitude and current technology does not provide enough isolation between transmit and receive paths to allow correct demodulation of the received signal when transmitting data.

Current collision avoidance protocols try to minimize collisions by exchanging handshaking messages to reserve the communication channel for data transmission. This handshaking can be considered as duplexing feedback information in time. Handshaking requires a node to switch between transmit and receive modes. More importantly, intrinsic to the handshaking protocols are turn-around periods called mute-deaf times. These are periods, when the transceiver is switching from transmit mode to receive mode or vice-versa. During these periods the transceiver can neither listen nor transmit. These switching time constraints are a large overhead at high data-rates.

Another alternative is to use a different frequency bands for the data channel and the feedback channel. This is referred to as frequency duplexed feedback, which is used by busy-tone protocols. However, this has a higher hardware cost, and low spectral efficiency, although it results in very efficient rate-scalable wireless MAC protocols. The high cost results from the requirement of two transceivers, one for the data channel and the other for the feedback channel. Even though the feedback channel is a narrow-band channel, a significant amount of bandwidth needs to be allocated for it because it is hard to implement band-pass filters that have small bandwidth and sharp cutoff.

One example of such a protocol is the receiver initiated busy tone multiple access protocol (RI-BTMA). Operation of the RI-BTMA protocol is relatively simple. When a node has data to transmit, it senses the busy-tone channel for any ongoing transmissions. If the channel is idle, the node will initiate a data transmission. A node will then send a busy tone in an out of band channel after it knows that it is the destination for this packet. If the node receives a busy tone signal it will continue with the transmission. Else, it would abort the transmission and retry after a random time. The efficiency of this protocol is limited by how fast the destination node can be determined and the busy tone asserted. As a result, such protocols are efficient over a wide range of data rates unlike handshaking protocols. However, the hardware cost of two transceivers and the inefficiency of a separate busy tone channel, which is attributed to the significant amount of bandwidth that has to be allocated to convey one bit of information, prohibits the use of such protocols.

SUMMARY OF THE INVENTION

In light of the foregoing, the present invention provides a cost effective system and method for providing high speed multi-media access within a telecommunication network.

Generally, the system can be implemented as follows. A local transceiver is provided, which is capable of transmitting data via a transmit path while receiving a feedback signal via a receive path. The local transmitter is connected to a feedback generator for generating and transmitting a feedback signal in response to receiving data from a wireless transceiver. A feedback detector is connected to the local transceiver for detecting feedback signals received from another wireless transceiver.

The present invention can also be viewed as providing a method for providing high speed multi-media access within a telecommunication network. In this regard, the method can be broadly summarized by the following steps: testing for a specified amount of energy within a data channel of a first wireless transceiver; decoding data associated with the specified amount of energy in response to detecting the specified amount of energy; the series of wireless transceivers transmitting a feedback signal within the series of wireless transceivers in order to stop the transmission of data within the series of wireless transceivers until a destination of the data is determined; identifying a destination address, associated with a destination wireless transceiver, for the data from the decoded data; and ceasing the transmission of the feedback signal by all wireless transceivers within the series of wireless transceivers, except by the destination wireless transceiver.

The invention has numerous advantages, a few of which are delineated hereinafter as examples. Note that the embodiments of the invention, which are described herein, possess one or more, but not necessarily all, of the advantages set out hereafter.

One advantage is that a wireless standard is provided, which has high efficiency at high data rates.

Another advantage is that it provides high efficiency without requiring addition transceivers.

Other features and advantages of the present invention will become apparent to one of reasonable skill in the art upon examination of the following drawings and detailed description. It is intended that all such additional features and advantages be included herein within the scope of the present invention as described by the claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION OF THE PREFERRED EMBODIMENT

Figure 2:
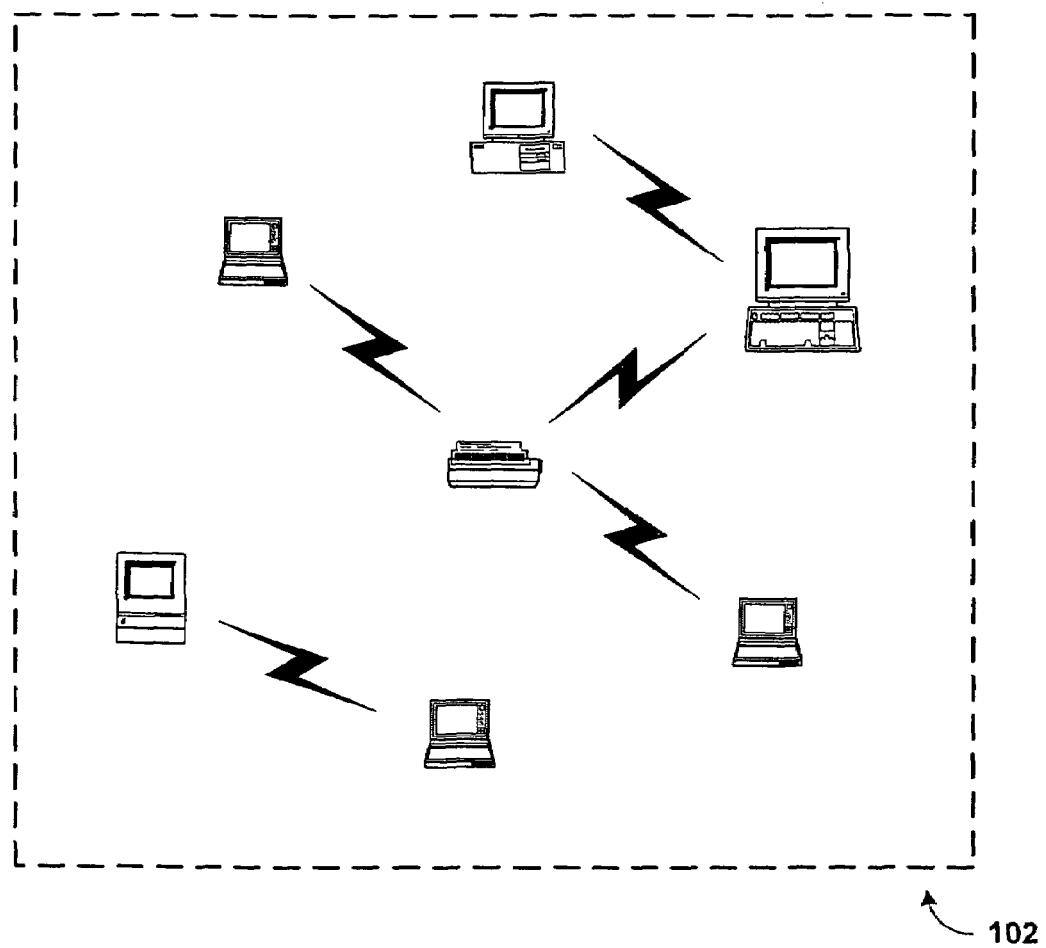
FIG. 2 is a block diagram illustrating a prior art an ad-hoc network, as is used in accordance with the preferred embodiment of the invention.

Referring now to the drawings, wherein like reference numerals designate corresponding parts throughout the drawings, FIG. 2 illustrates a prior art distributed wireless network 102, also called an ad-hoc network. The ad-hoc network 102 is a group of wireless terminals communicating with one another with no pre-existing infrastructure in place. The wireless terminals, which may include, but are not limited to, computers, printers, and laptops, typically contain a wireless interface, such as a radio frequency or infra-red interface, and exchange information between one-another in a distributed manner. As illustrated, an ad-hoc network 102 has no central administration and this ensures that the network 102 does not collapse when one of the terminals is powered down or moves away.

In an ad-hoc network 102 all data transmission and reception is in the same frequency band since there are no special terminals (hereinafter, nodes) to translate the transmission from one frequency band to another. Therefore, the ad-hoc network 102 operates in a time division duplex mode.

Referring back to FIG. 1 as described hereinabove, within the background of the invention FIG. 1 illustrates an example of a logical abstraction of a prior art ad-hoc network 102. It should be noted that any protocol designed for an ad-hoc network 102, such as the network 102 illustrated by FIG. 1, should allow for multiple non-interfering conversations to take place simultaneously. For consistent operation, the network 102 should guarantee that each source node hears a feedback signal only from a corresponding destination node. Similarly, it should also guarantee that each destination node receives the data transmission from a corresponding source node. Thus, the signal that is received by any one node is dependent on its state and location.

Figure 1:
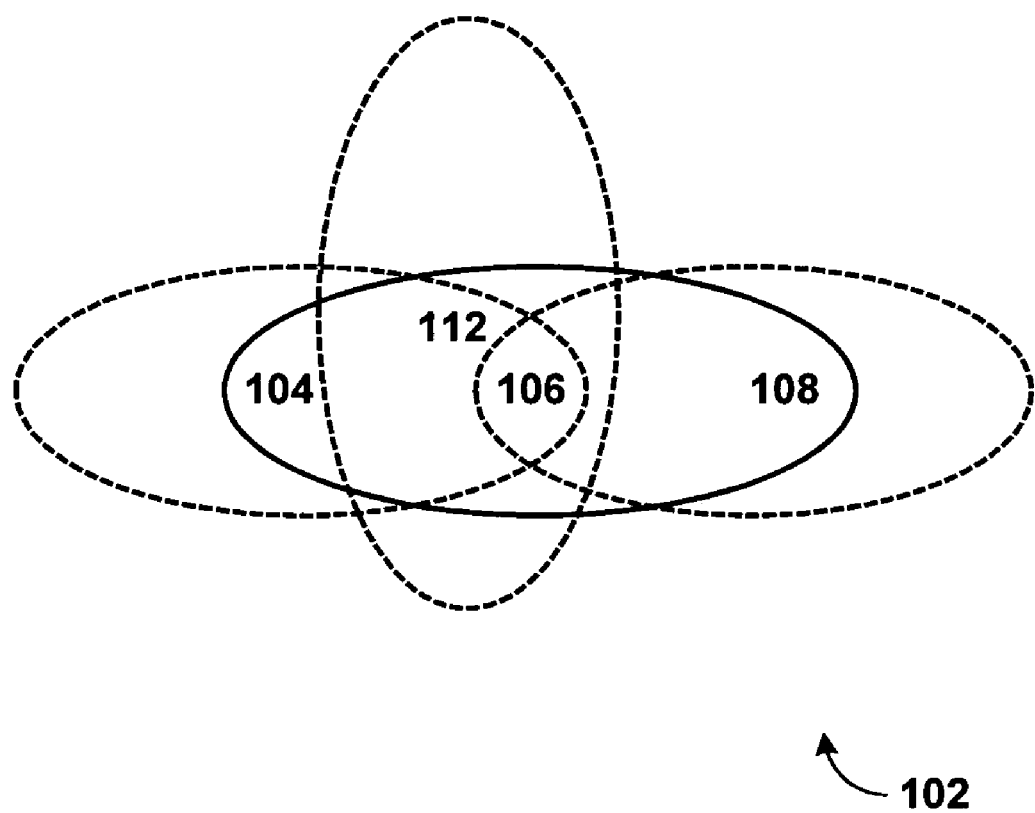
FIG. 1 illustrates an example of a logical abstraction of a prior art ad-hoc network.

Referring to FIG. 1, a first node 104, a second node 106, a third node 108, and a fourth node 112, are located with the ad-hoc network 102. In accordance with the preferred embodiment of the invention, nodes 104, 106, 108, and 112 may be any transmitting and/or receiving terminals, such as, but not limited to, a computer, telephone, video cassette recorder, or laptop, wherein wireless communication is prevalent. Describing the network 102 of FIG. 1, when node 104 is transmitting to node 106, nodes 108 and 112 cannot hear node 104's transmission. However, node 108 can hear node 106's feedback signal and therefore node 108 cannot start a transmission to any other node. Node 112 can hear neither node 104's transmission nor node 106's busy tone, therefore, node 112 can initiate a transmission to node 108. Node 108 can receive node 112's data without errors since it is out of the transmit range of node 104. As such, when node 108 receives the data, it asserts a busy tone, hence, node 112 can continue transmitting data to node 108. In this example it can be seen that nodes 106 and 108 should be able to receive data in the presence of more than one node transmitting a busy tone. Considering the converse case, when node 106 is sending data to node 104, and node 108 is sending data to node 112, nodes 106 and 108 should be able to detect a feedback signal from nodes 104 and 112 respectively in the presence of more than one data transmission.

All nodes within the network 102 are in one of the following three modes; transmitting data, receiving data or listening to the channel used for communication between the nodes. Based on the state and location of the node, the signal received by the node is different. The problems associated with each of these modes is described hereinbelow. To best illustrate these problems, a signal that is received by a node in each state is formulated, thereby defining its decoding problem.

Without loss of generality, a node i, the source, is considered to be transmitting data to a node j the destination. Let $s_i(t)$ be the signal transmitted by source i. Similarly, $f_j(t)$ is the feedback signal transmitted by the destination node j. The noise on the wireless channel is denoted by $n(t)$. $h_{d_{ij}}(t)$ is the channel response seen by node j for the data signal transmitted by node i. $h_{f_{j,i}}(t)$ is the channel response for the feedback signal transmitted by node j at node i.

Data Transmitter Problem

When a node is transmitting data, a part of the transmitted signal leaks into the receiver. This leakage signal is a delayed ($t_d$) and attenuated ($\alpha$) version of the transmitted signal. Also, the channel shaped feedback signal generated by the destination, and any other data transmission in its range, are also received. The received signal is represented by the equation:

$$R_i(t) = f_j(t) * h_{f_{j,i}}(t) + \alpha s_i(t - t_d) + \sum_k h_{d_{k,i}}(t) * s_k(t) + n(t) \quad \text{(Eq. 1)}$$

where k is the set of all nodes in the transmit radius of i that are transmitting data. It is assumed that the communication channel does not change over the duration of the packet transmission. The data transmitter should be able to decode the feedback signal, $f_j(t)$, in the presence of interference from its own transmission and any other adjacent data transmissions. It is necessary to reduce self-interference to such an extent that it does not swamp-out the feedback signal. As illustrated hereinbelow, one way to achieve this is to use echo cancelation to make $\alpha$ as small as possible. Also, by positioning the feedback channel at a location in the data spectrum where there is little data energy (spectral null) the self interference can be minimized.

Data Receiver Problem

Considering the case when a node is receiving data, the node must send the feedback signal concurrently. Unfortunately, the feedback signal leaks into the data reception path and interferes with data demodulation. The leakage signal in the receive path is a delayed and attenuated version of the feedback signal. The received signal may be represented by the equation:

$$R_j(t) = s_i(t) * h_{d_{i,j}}(t) + \alpha f_j(t - t_d) + \sum_k h_{f_{k,j}}(t) * f_k(t) + n(t) \quad \text{(Eq. 2)}$$

where k is the set of all nodes in the transmit radius of j that are transmitting the feedback signal. The data transmitter should be able to decode the data signal $s_i(t)$ in the presence of multiple interfering feedback signals. The position of the feedback channel is crucial. As shown hereinbelow, placing the feedback channel at the spectral null of the receiver matched filter minimizes the influence of the feedback signal on the demodulation of data, as the matched filter rejects most of the energy around its null frequency.

Listener Problem

A node in listen state is neither transmitting nor receiving data. Instead, it is waiting for its turn to send or receive data. This node should not initiate a transmission if it will collide with any ongoing transmissions. To satisfy this condition, the node should be able to detect the feedback transmission from any one of the nodes that are within its transmission range. The received signal may be represented by the equation:

$$R_i(t) = \sum_k h_{f_{k,i}}(t) * f_k(t) + \sum_l h_{d_{l,i}}(t) * s_l(t) + n(t) \quad \text{(Eq. 3)}$$

where l and k are the set of the transmitting and the receiving nodes respectively, within the transmit range of the listening node i. For correct operation of the protocol, the listener should not initiate a transmission if any one of the feedback transmissions is active. The listener node should reliably detect any feedback transmission in the presence of interfering data transmissions and noise. False detection of the feedback signal that is really not present decreases the efficiency of the protocol, however, non detection of a feedback signal that exists results in destroying an ongoing transmission.

In addressing the above-mentioned problems, it should be noted that theoretically, full duplex communication should be possible between a source node and a destination node since each node knows its own transmitted signal and therefore can cancel self-interference. Unfortunately, such a receiver is not yet possible with current-day technology. However, a narrow-band feedback channel can be enabled within the data channel of a communication channel by taking advantage of the fact that the power spectrum of a modulation scheme contains nulls, and any energy at a null frequency is orthogonal to the data transmission. Transmission in the feedback channel results in minimal interference because a receiver's front-end matched filter also has a null at that frequency and removes much of the energy at the null frequency. Thus, the cross interference between the data and feedback channels can be minimized.

Figure 3:
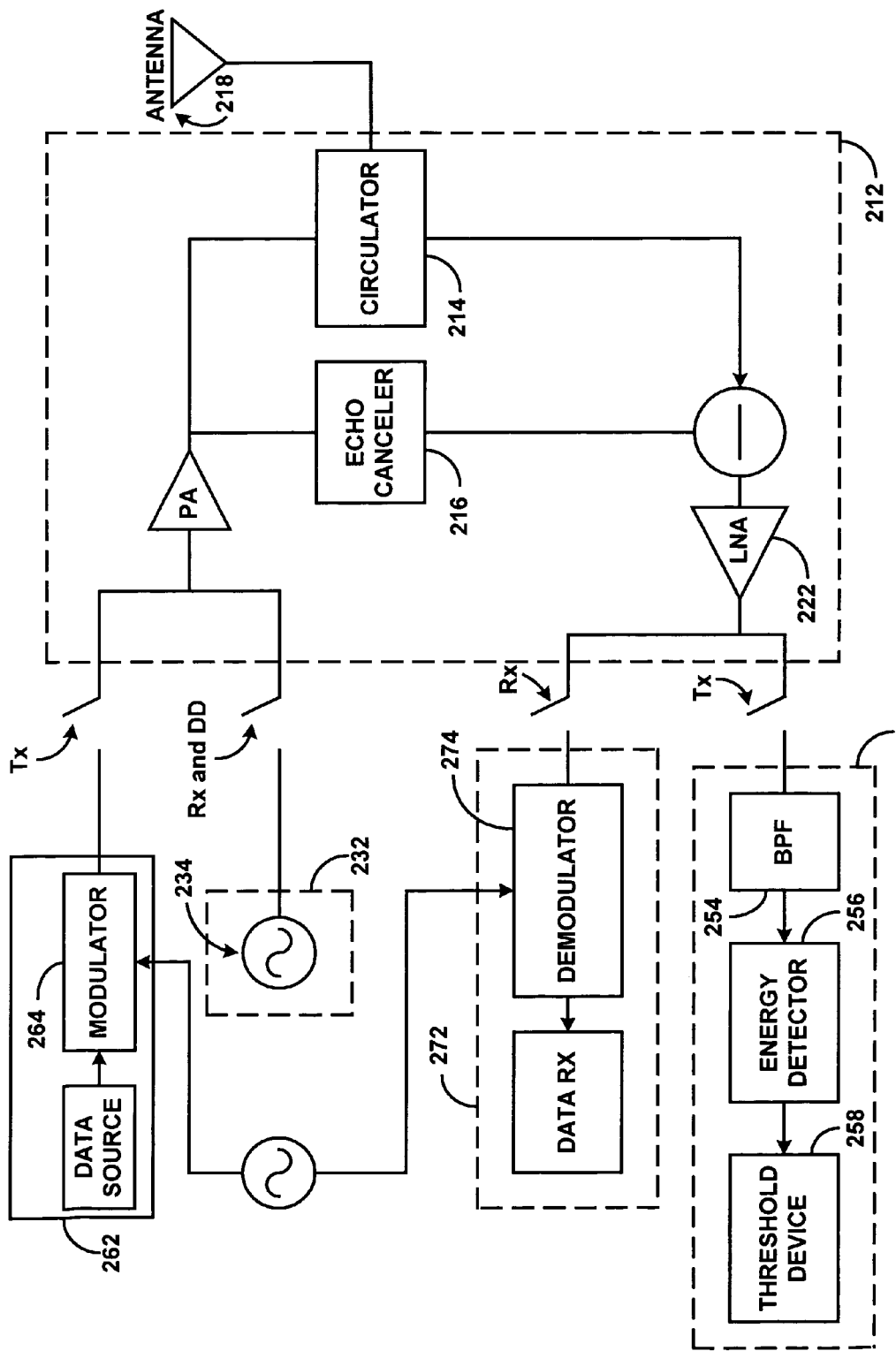
FIG. 3 is a block diagram illustrating a wireless transceiver located within each node located within the ad-hoc system of FIGS. 1 and 2, that is used to enable high-speed wireless media access.

FIG. 3 is a block diagram illustrating a wireless transceiver 202 located within each node located within the ad-hoc system 102, that is used to enable high-speed wireless media access, in accordance with the preferred embodiment of the invention. The transceiver 202 comprises a modified time division duplex (TDD) transceiver 212 having a feedback generator 232 and a feedback detector 252, as well as a modulator 264, located within a transmitter 262, and a demodulator 274, located within a receiver 272. As known in the art, a basic TDD transceiver comprises a modulator and a demodulator and a transmit/receive switch, wherein the transmit/receive switch controls which path (transmit or receive) is enabled. In accordance with the preferred embodiment of the invention, the transmit/receive switch is replaced by a combination of a circulator 214 and an RF echo canceler 216. The circulator 214 passes a signal received via an antenna 218 to a low noise amplifier (LNA) 222. It should be noted that a dual-antenna is preferably used. In addition, the circulator 214 passes a signal to be transmitted to the antenna 218 with very little attenuation.

Typical circulators can achieve only 20 dB isolation between undesired ports. As a result, an attenuated version of the transmitted signal leaks into the receive path. Since the received signal has a much lower signal strength than the transmitted signal, the RF echo canceler is needed in the feedback channel band to minimize self-interference. This modified RF front-end achieves reasonable isolation between the transmit and receive paths in the frequency band of the feedback channel. Reasonable isolation is accordance with the preferred embodiment of the invention is further described hereinbelow.

The feedback detector 252 further comprises a bandpass filter 254 to select a feedback channel. The bandpass filter 254 is followed by an energy detector 256 which estimates the signal energy in the feedback channel. The energy detector 256 is connected to a threshold device 258 which makes decisions on whether the energy in the feedback channel is noise or a valid busy signal.

The feedback generator 232 further comprises an oscillator 234 at the feedback channel's center frequency which injects energy into the feedback channel.

Figure 4:
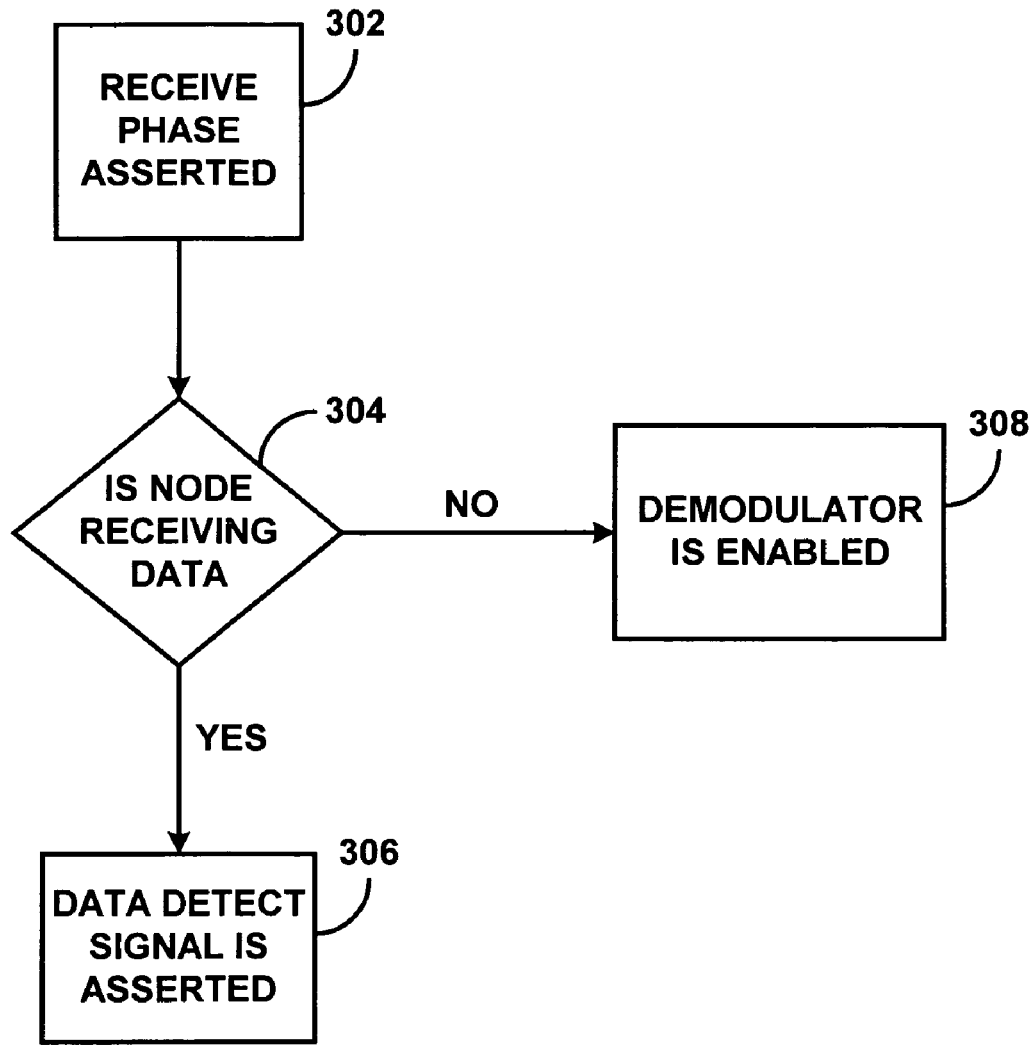
FIG. 4 is a flowchart that illustrates functionality performed by the wireless transceiver of FIG. 3, when a node is in listening mode.

FIG. 4 is a flow chart that illustrates functionality performed by the wireless transceiver 202 when a node is in listening mode. It should be noted that with reference to the flowcharts provided herein, each block represents a module, segment, or portion of code, which comprises one or more executable instructions for implementing the specified logical function(s). In some alternative implementations, the functions noted in the blocks may occur out of the order noted. For example, two blocks shown in succession may in fact be executed substantially concurrently or the blocks may sometimes be executed in the reverse order, depending upon the functionality involved, as will be further clarified hereinbelow.

As shown by block 302, when a node is in listening mode, a receive phase is asserted. The transceiver 202 then determines if the node is receiving data (block 304). If the node is already receiving data, a data detect signal is asserted and a feedback signal is received by every node within the transmit radius of the transceiver 202 (block 306). As shown by block 308, if the node is not receiving data, the demodulator 274 is enabled and data can be received by the transceiver 202.

Figure 5:
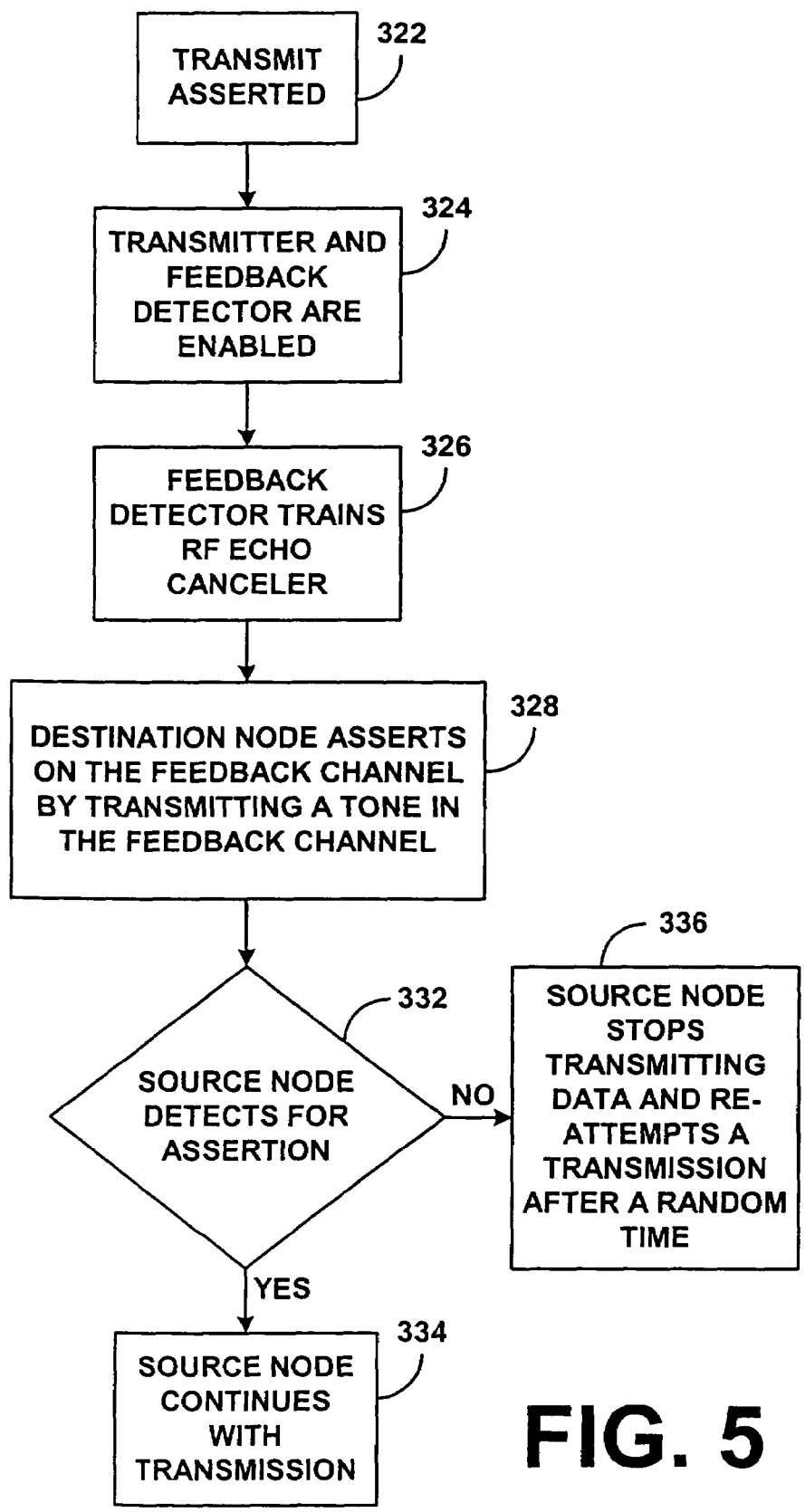
FIG. 5 is a flow chart that illustrates functionality performed by the wireless transceiver of FIGS. 3 and 4, when a node contains data to transmit.

FIG. 5 is a flow chart that illustrates functionality performed by the wireless transceiver 202 when a node contains data to transmit. As shown by block 322, when a node is ready to transmit, a transmit phase is asserted. Assertion of the transmit phase causes enablement of both, the transmitter 262 and the feedback detector 252 (block 324). There is some time lag from the time the data is transmitted to the time the feedback signal is asserted. As shown by block 326, the feedback detector 252 uses this period to train the RF echo canceler 216 to cancel any energy in the feedback channel. In accordance with the preferred embodiment of the invention, the destination node then asserts on the feedback channel by transmitting a tone in the feedback channel (block 328). As known in the art, tone is energy at a single frequency. Therefore, by asserting on the feedback channel by transmitting a tone, the destination node is injecting energy at a particular frequency. The source node then detects for the assertion (block 332). If the source node detects this assertion (detection of the tone in the feedback detector 252), it continues with its transmission (block 334). Otherwise, the source node stops transmitting data and re-attempts a transmission after a random time, in accordance with the rules specified in the MAC protocol (block 336).

Design Choice and Challenge

Two main challenges exist in making the wireless transceiver 202 feasible, namely the isolation required between the transmit and receive paths, and the spectral position of the feedback channel. The following describes these challenges in detail, thereby further defining functionality of the wireless transceiver 202.

Addressing the issue of isolation, it is well known that the traditional RF transceiver based on time division duplex comprises a transmitter and a receiver which time-share the same RF front-end. At any given time only one of the paths is connected to an antenna. With multi-path fading and path loss, the dynamic range of a received signal in a local area network (LAN) environment is approximately 60–80 dB. As the minimum detectable signal is in the microvolt range, the signal that leaks into a LNA through a duplexer from a transmit power amplifier may significantly desensitize the LNA. This is the main reason why the transmit and the receive time slots are offset in TDD systems. Therefore isolation is a major concern for having full duplex communication on wireless systems.

It is feasible to isolate the transmit and receive paths by 72 dB over a 200 kHz radio channel by using a dual-antenna and an adaptive RF echo canceler. Such self-interference rejection in the narrow-band feedback channel suffices for transceiver operation in accordance with the preferred embodiment of the invention. Alternatively, isolation can be further improved by using a baseband digital echo canceler. The preferred transceiver requires such isolation only in the frequency band used for the feedback channel, which is a much smaller band compared to the data channel.

Addressing the issue of the spectral position of the feedback channel, it should be noted that if self interference could be completely canceled, the position of the feedback channel within the databand would not be a factor at all and full duplex communication would be feasible. In practical cases, however, the feedback channel should be located at a position where it would have minimum interference on data demodulation. This reduces the design requirements on the RF echo canceler. For example, if the feedback channel and data channel have the same frequency, then the feedback signal should be completely canceled or it would result in a DC offset at the demodulator output.

A coherent receiver is a commonly used receiver structure in digital communications. The received signal is cross-correlated with each candidate pulse shape and the pulse shape that correlates best with the received signal is assumed to be the symbol transmitted. Letting R(t) be the received signal, R(t) comprises the transmitted data signal (S(t)), additive white gaussian noise (n(t)) and an interfering signal (I(t)). The transmitted signal S(t) is a pulse $p_n(t)$ where the transmitted pulses are orthogonal and of equal energy.

The received waveform $(R(t)=p_n(t)+n(t)+I(t))$ is correlated with each one of possible N pulse shapes. The correlation with the ith pulse is given by the equation:

$$K_i = \int_\infty^\infty R(t)p_i(t)dt = \int_\infty^\infty (p_n(t)+n(t)+I(t))p_i(t)dt \quad \text{(Eq. 4)}$$

As illustrated, the equation consists of three terms. The third term is introduced by the feedback signal and other interfering signals that are transmitted during data transmission. The condition for this interference to not affect the data reception is $$\int_\infty^\infty I(t)p_i(t)=0.$$

In the simplest case, if it is assumed that the feedback signal is a sinusoid and there are no other interferers, then correlation of the interference term becomes $$\int_\infty^\infty A\sin(2\pi f_T t)p_i(t) = A\sin(2\pi f_T t)*p_i(-t)|_{t=0} = P_i(f_T)$$

where $P_i(f)$ is the Fourier transform of the pulse $p_i(t)$.

Hence, if the feedback is introduced at the spectral null of the data power spectrum, correlation receiver can demodulate the data signal with little interference. Some modulation pulses have spectral nulls at the symbol frequency. Spectral nulls can be introduced at any frequency or a finite set of frequencies using a filter at the transmitter at the cost of increasing the peak transmitter power. In wide-band modulation techniques like code division multiple access (CDMA), a narrow-band signal in the data channel is like a narrow-band interferer. Spread-spectrum systems are designed to work well in the presence of such narrow-band interference. Thus, in spread spectrum channels the presence of a feedback signal causes very little interference to the demodulation of data.

Wireless Collision Detect Protocol

In accordance with the preferred embodiment of the invention, a wireless collision detect protocol (WCD) is used for the current ad-hoc network 102, and all ad-hoc networks confined within a short radius (≦50 m). It should be noted that the WCD protocol can operate correctly in an unslotted environment, however for simplicity, it is assumed that the system is slotted and the unslotted version is not discussed further herein.

The following defines a few terms used in the WCD protocol description. First, the slot should be long enough such that the carrier can be detected and the feedback signal asserted by the most distant node in the system. This consists of three components; a round trip time, time to detect the carrier, and time to assert the feedback signal. This amount of time is called the idle detection interval (IDI) since it is the minimum period of time a node needs to sample the feedback channel to ascertain if the data channel is idle.

The time period taken to determine the destination of the current transmission and assert on the feedback channel is defined as the receiver detection interval (RDI). The RDI comprises the time for a node to decode the transmission, identify itself as the destination, and assert the feedback signal.

The frequency band is split into a data channel and a feedback channel (FC). Two logically different signals are transmitted in the feedback channel. The first is the carrier detect (CD) signal which is asserted when the start of a burst transmission is detected. The second is an address detect (AD) signal which indicates that an address has been matched with a station identification and data is being received. Station Identification is a unique number assigned to a terminal. Basically, it can be something similar to the Ethernet address attached to every hardware device. This signal is similar to the receiver initiated feedback in RI-BTMA. The additional CD signal does not add extra complexity or hardware requirements.

The channel is said to be idle when there is no signal in the feedback channel. Any node in the network is either in data receive mode or data transmit mode. If the node does not have any packets to transmit or is waiting to transmit a packet, it is in data receive mode. When a new packet arrives, the node picks a random number in the range [0, W] and stores it in a backoff counter. This counter is decremented for each idle slot. When the counter goes to zero, the node switches from data receive mode to data transmit mode. The protocol is described hereinbelow and illustrated with reference to FIG. 6, which is described in detailed by the flow charts of FIGS. 7 and 8.

Figure 6:
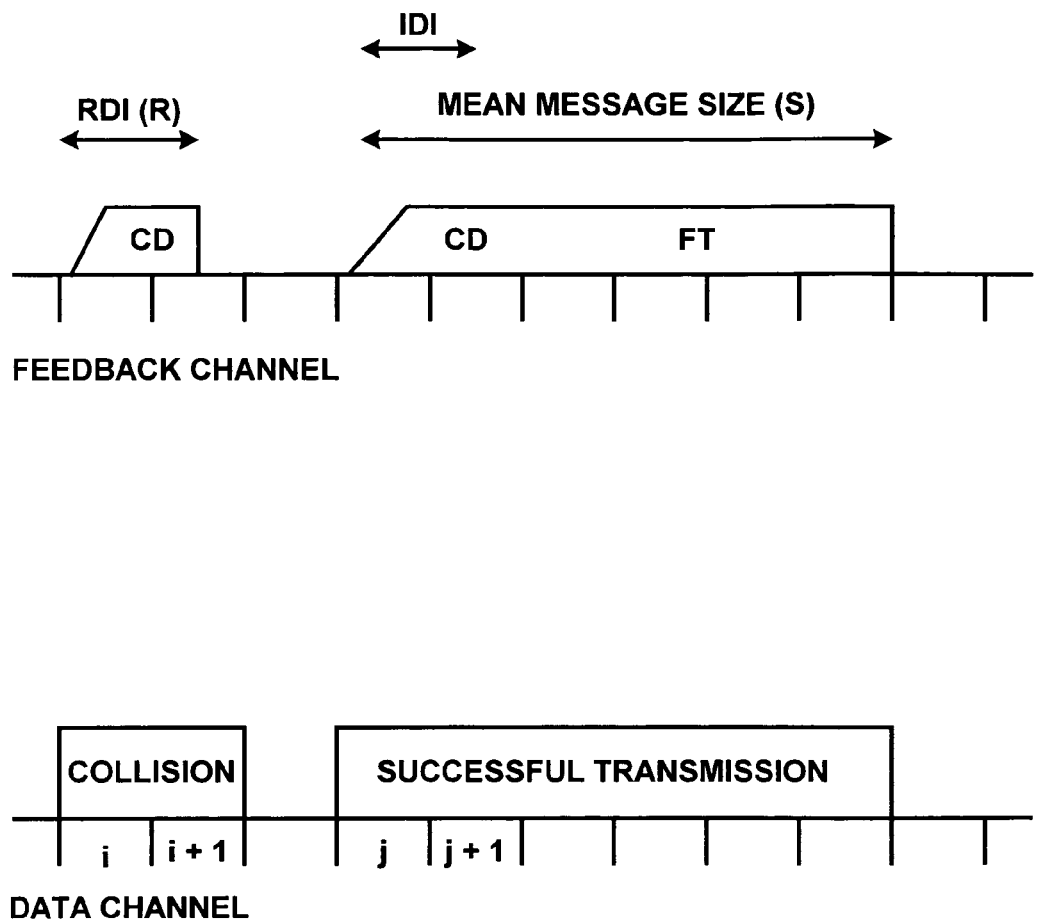
FIG. 6 is an example illustration of the protocol used within the wireless transceiver of FIG. 3.

Further describing the example illustration of the protocol depicted in FIG. 6, it is assumed that more than one node attempts to transmit a packet in slot i. Each node that hears this data transmission asserts the feedback signal by the end of slot i. When the MAC address match fails, all nodes deassert the feedback signal. The transmitting nodes stop their transmission when they find that the feedback signal is not asserted at the end of slot i+1. In slot j, when only one node transmits, the feedback signal continues to be asserted after the receiver detection interval, and the packet transmission is completed.

Rules For a Node in Data Receive Mode

Figure 7:
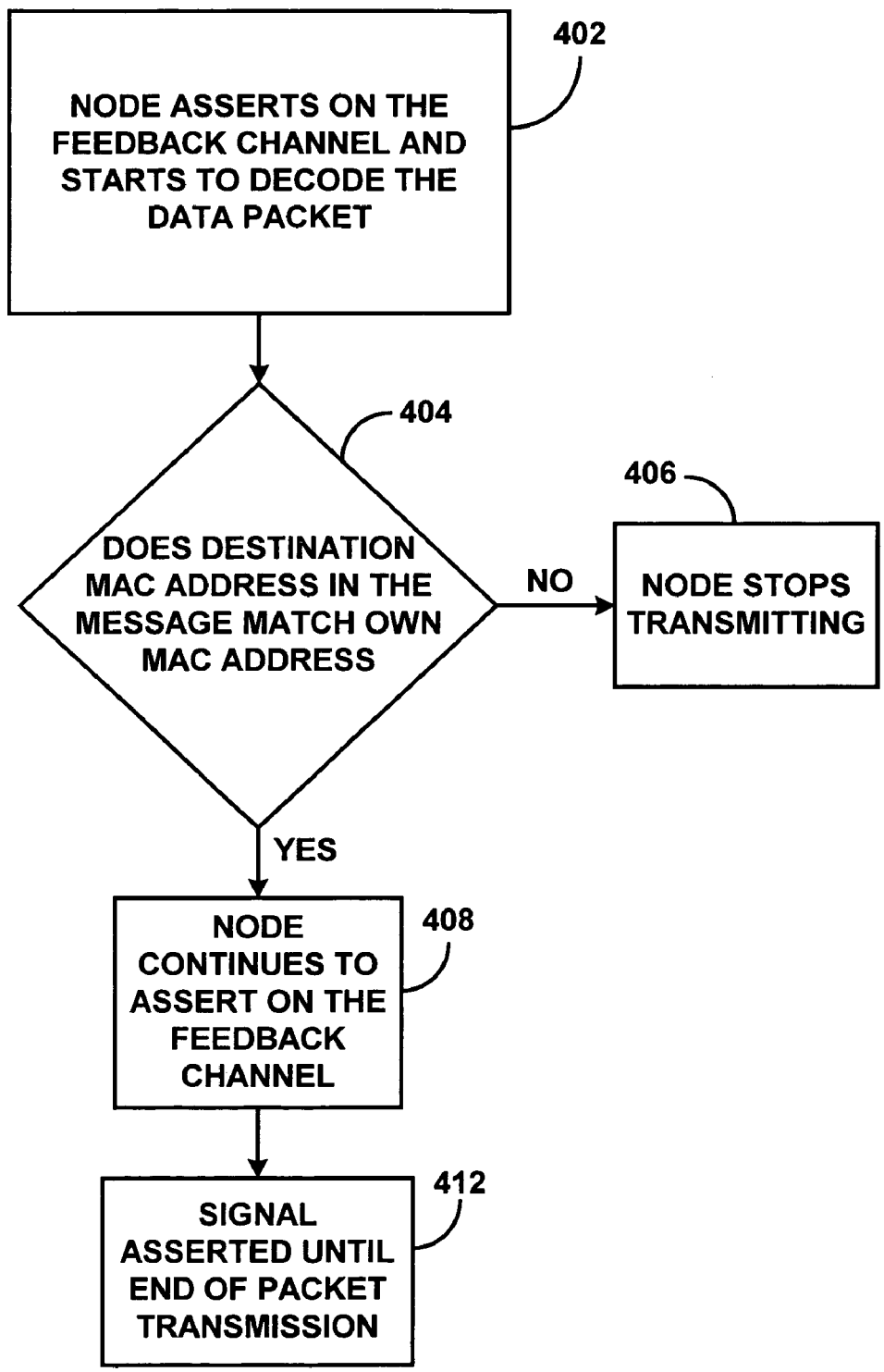
FIG. 7 is a flowchart that logically depicts functionality of the protocol of FIG. 6, in data receive mode.

FIG. 7 is a flow chart that logically depicts functionality of the WCD protocol in data receive mode, in accordance with the preferred embodiment of the invention. As shown by block 402, when a node in data receive mode detects the start of a data transmission, it asserts on the feedback channel and starts to decode the packet. As shown by block 404, after the header of the packet is received, each node determines if the destination MAC address in the message matches its own MAC address. If the match fails, the node stops transmitting the feedback signal (block 406). However, if a match is found, the node continues to assert on the feedback channel (block 408). As shown by block 412, this signal is then asserted until the end of the packet transmission.

Rules for a Node in Data Transmit Mode

Figure 8:
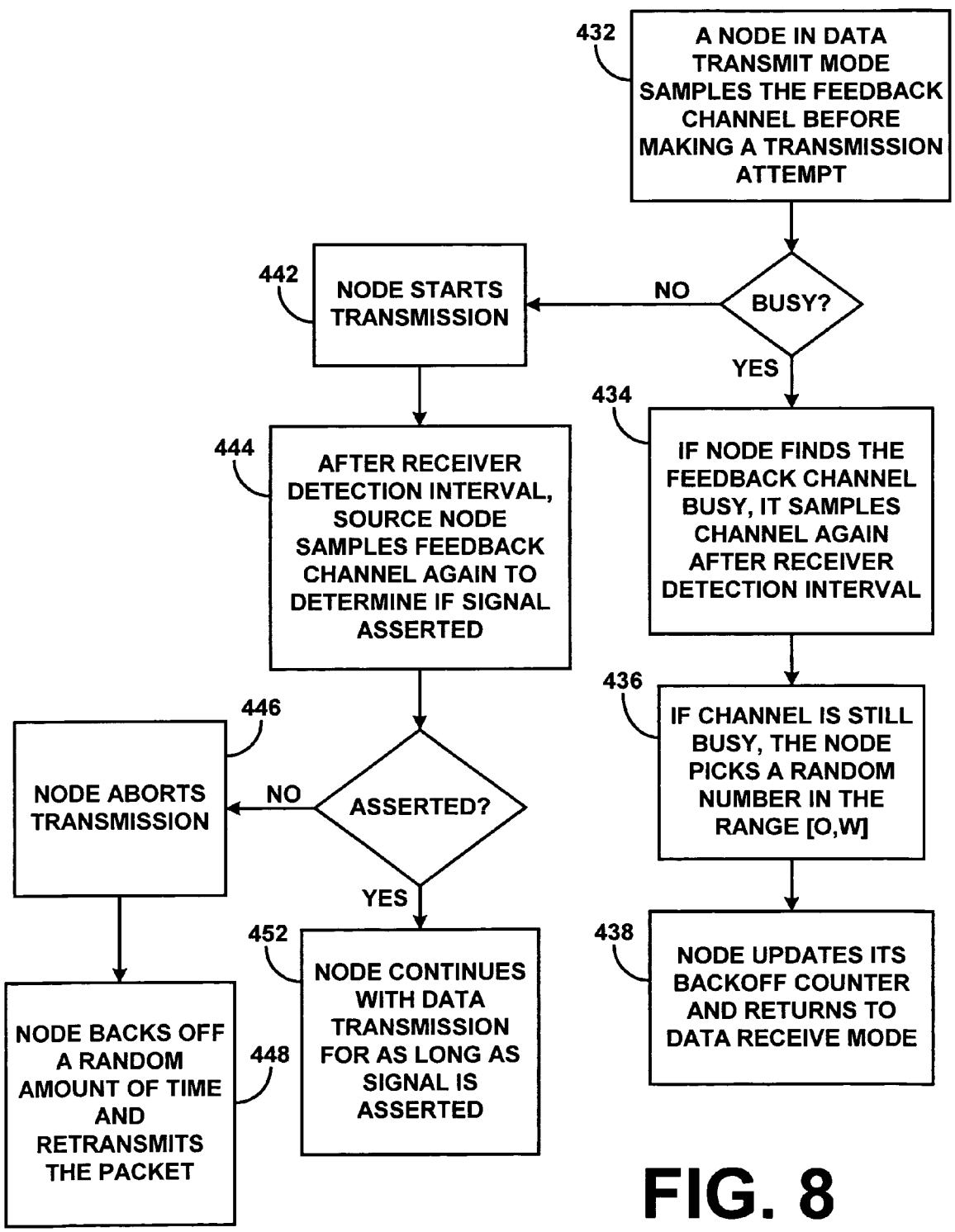
FIG. 8 is a flowchart that logically depicts functionality of the protocol of FIG. 6, in transmit mode.

FIG. 8 is a flowchart that logically depicts functionality of the WCD protocol in transmit mode, in accordance with the preferred embodiment of the invention. As shown by block 432, a node in data transmit mode samples the feedback channel before making a transmission attempt to determine if the feedback channel is busy. As shown by block 434, if the node finds the feedback channel busy, it will sample the channel again after the receiver detection interval. If the channel is still busy, the node picks a random number in the range [0, W] (block 436). As shown by block 438, the node then updates its backoff counter and returns to data receive mode. As shown by block 442, if the node does not detect a feedback signal the node starts a transmission. After the receiver detection interval, the source node samples the feedback channel again (block 444). If the feedback signal is not asserted, this implies that the destination has not been able to decode the transmission (block 446). Therefore the node aborts its transmission. As shown by block 448, the node will then back off a random amount of time and retransmit the packet at that time. However, as shown by block 452, if the signal is asserted on the feedback channel, the node can continue with data transmission for as long as the signal is asserted.

As a brief summary of the properties of the WCD protocol, the following is offered. The time for which the packet is vulnerable for collision is very small because carrier detection usually takes about 10–20 symbol periods while collision detection takes more than a hundred symbols. Under the assumption of reciprocal wireless links this protocol eliminates the hidden node problem and the exposed node problem.

Addressing the elimination of the hidden node problem, consider the same four nodes as illustrated by FIG. 2, consider that the first node 104 is transmitting to the second node 106. Since the third node 108 cannot hear the first node's 104 transmission, it is a hidden node. In accordance with the preferred embodiment of the invention, the first node 104 continues transmission only when the second node 106 asserts on the feedback channel. When the third node 108 sees that the second node's 106 feedback signal is asserted, it does not initiate a transmission. Any node in the range of the second node 106 should detect the asserted feedback signal assuming that wireless links are reciprocal. Hence all nodes within transmission of the second node 106 are prevented from initiating a data transmission and causing a collision with the data being transmitted from the first node 104 to the second node 106. As a result, hidden nodes are eliminated.

Considering the same scenario as that described hereinabove, except now the second node 106 is transmitting to the first node 104. In accordance with the wireless collision detect protocol, the second node 106 can send data to the first node 104, and the third node 108 can simultaneously send data to the fourth node 112. For example, the second node 106 sends data to the first node 104, and the first node 104 asserts on the feedback channel. The third node 108 does not hear this feedback signal and hence can start a transmission. Since the fourth node 112 is out of range of the second node, it can receive the third node's 108 transmission and it asserts on the feedback channel.

The third node 108, on detecting the feedback signal completes its data transmission. All nodes in transmitting range of the sender will hear the data transmission and only those nodes in the transmit range of the destination will sense the feedback signal. Any node out of range of the destination node can have a parallel conversation with any node out of range of the sender. Although the third node 108 can send to the fourth node 112, the fourth node 112 cannot transmit to the third node 108 because the third node is in range of two senders (the second node 106 and the fourth node 112, in this case).

Appendix A provides further disclosure of the analysis and simulation of the protocol used within the wireless transceiver 202, which is herein incorporated by reference.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A wireless transceiver for providing high speed wireless media access, comprising:
   a local transceiver which is capable of transmitting data, via a transmit path while receiving a feedback signal via a receive path;
   a feedback generator connected to said local transceiver for generating and transmitting a feedback signal in response to said wireless transceiver receiving data; and
   a feedback detector connected to said local transceiver for detecting feedback signals,
   wherein said transmitting of said feedback signal is performed within a frequency null to provide isolation between said transmit path and said receive path.

2. The wireless transceiver of claim 1, wherein said wireless transceiver ceases transmission of data upon detection of said feedback signal from a second wireless transceiver.

3. The wireless transceiver of claim 1, wherein said wireless transceiver is used within a wireless system.

4. The wireless transceiver of claim 1, wherein said local transceiver further comprises a circulator for minimizing attenuation of a received signal, and a radio frequency echo canceler for minimizing self interference, wherein said local transceiver achieves isolation between transmit and receive paths of said wireless transceiver.

5. The wireless transceiver of claim 1, wherein said data transmission is a wide band data transmission and said feedback signal is a narrow-band feedback signal.

6. The wireless transceiver of claim 1, wherein said local transceiver performs isolation between said transmit path and said receive path through use of a radio frequency echo canceler located within said local transceiver.

7. The wireless transceiver of claim 1, wherein said feedback detector further comprises an energy detector which is capable of detecting a specific amount of energy within a feedback channel, that is representative of a feedback signal.

8. The wireless transceiver of claim 7, wherein detection of said specific amount of energy results in said wireless transceiver ceasing transmission of data until said feedback signal is de-asserted.

9. The wireless transceiver of claim 7, wherein said specific amount of energy is derived from said feedback generator which is capable of injecting energy within a particular frequency.

10. A wireless transceiver for providing high speed wireless media access, comprising:
    a means for transmitting data via a transmit path, while receiving a feedback signal via a receive path;
    a means for generating and transmitting a feedback signal in response to receiving data, connected to said means for transmitting data; and
    a means for detecting feedback signals, connected to said means for transmitting data,
    wherein said transmission of said feedback signal is performed within a frequency null to provide isolation between said transmit path and said receive path.

11. The wireless transceiver of claim 10, wherein said wireless transceiver ceases transmission of data upon detection of said feedback signal from a second means for transmitting data.

12. The wireless transceiver of claim 10, wherein said wireless transceiver is used within a wireless system.

13. The wireless transceiver of claim 10, wherein said means for transmitting data further comprises a means for minimizing attenuation of a received signal, and a means for minimizing self interference, wherein said means for transmitting data achieves isolation between transmit and receive paths of said wireless transceiver.

14. The wireless transceiver of claim 10, wherein said data transmission is a wide band data transmission and said feedback signal is a narrow-band feedback signal.

15. The wireless transceiver of claim 10, wherein said means for transmitting data performs isolation between said transmit path and said receive path through use of an isolation means located within said means for transmitting data.

16. The wireless transceiver of claim 10, wherein said means for detecting feedback signals further comprises a means of detecting a specific amount of energy within a feedback channel, that is representative of a feedback signal.

17. The wireless transceiver of claim 16, wherein detection of said specific amount of energy results in said wireless transceiver ceasing transmission of data until said feedback signal is de-asserted.

18. The wireless transceiver of claim 16, wherein said specific amount of energy is derived from said means for generating and transmitting a feedback signal, which is capable of injecting energy within a particular frequency.

19. A method of providing high speed wireless media access between a series of wireless transceivers, comprising the steps of:

testing for a specified amount of energy within a data channel of a first wireless transceiver;

decoding data associated with said specified amount of energy in response to detecting said specified amount of energy;

said series of wireless transceivers transmitting a feedback signal within said series of wireless transceivers in order to stop the transmission of data within said series of wireless transceivers until a destination of said data is determined;

identifying a destination address, associated with a destination wireless transceiver, for said data from said decoded data; and ceasing the transmission of said feedback signal by all wireless transceivers within said series of wireless transceivers, except by said destination wireless transceiver.

20. The method of claim 19, wherein said steps of testing for said specified amount of energy and identifying said destination address, are performed simultaneously.

21. The method of claim 19, wherein said method is provided within a wireless communication system.

* * * * *